(12) United States Patent
Mauborgne et al.

(10) Patent No.: US 9,897,718 B2
(45) Date of Patent: Feb. 20, 2018

(54) NEUTRON-ABSORBING GAMMA RAY WINDOW IN A DOWNHOLE TOOL

(71) Applicant: SCHLUMBERGER TECHNOLOGY CORPORATION, Sugar Land, TX (US)

(72) Inventors: Marie-Laure Mauborgne, Clamart (FR); Ahmed Amine Mahjoub, Clamart (FR); Markus Berheide, Medford, MA (US); Christian Stoller, Princeton Junction, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/104,354

(22) PCT Filed: Dec. 17, 2014

(86) PCT No.: PCT/US2014/070701
§ 371 (c)(1),
(2) Date: Jun. 14, 2016

(87) PCT Pub. No.: WO2015/100078
PCT Pub. Date: Jul. 2, 2015

(65) Prior Publication Data
US 2016/0320521 A1 Nov. 3, 2016

(30) Foreign Application Priority Data
Dec. 23, 2013 (EP) ..................................... 13306857

(51) Int. Cl.
*G01V 5/10* (2006.01)
(52) U.S. Cl.
CPC .................................. *G01V 5/101* (2013.01)

(58) Field of Classification Search
CPC ........ G01V 5/101; G01V 5/125; G01V 5/102; G01V 5/107; G01V 5/10
(Continued)

(56) References Cited

U.S. PATENT DOCUMENTS 3,065,346 A * 11/1962 Dewan ................... G01V 5/101
250/267
3,975,233 A * 8/1976 Wende ..................... G21C 7/10
376/288

(Continued)

FOREIGN PATENT DOCUMENTS

EP 0231693 A1 8/1987
EP 0389345 B1 6/1995
(Continued)

OTHER PUBLICATIONS

International Search Report and Written Opinion issued in the related PCT Application PCT/US2014/070701 dated Mar. 6, 2015 (11 pages).
(Continued)

*Primary Examiner* — Taeho Jo

(57) ABSTRACT

Methods and downhole tools involving neutron-absorbing gamma ray windows are provided. One such method involves emitting neutrons from a neutron source in a downhole tool in a well into a surrounding geological formation. This may produce formation gamma rays through interactions between the neutrons and elements of the geological formation. The formation gamma rays may be detected by a gamma ray detector when the gamma rays pass via a gamma ray window that includes a neutron-absorbing material disposed in a substrate material of the downhole tool. The gamma ray window may be both more transmissive of gamma rays than the substrate material and less transmissive of neutrons than a window without the neutron-absorbing material. This may decrease a neutron flux that (Continued)

would otherwise reach the gamma ray detector and the tool materials surrounding it and thus would otherwise lead to a background signal contaminating a signal corresponding to the detected formation gamma rays.

15 Claims, 10 Drawing Sheets

(58) Field of Classification Search
USPC .................................................. 250/269.6
See application file for complete search history.

(56) References Cited

U.S. PATENT DOCUMENTS

| | | | | | |
|---|---|---|---|---|---|
| 4,978,851 | A | * | 12/1990 | Youmans | G01V 5/101 250/268 |
| 5,539,225 | A | * | 7/1996 | Loomis | G01V 5/101 250/254 |
| 5,608,215 | A | * | 3/1997 | Evans | G01V 5/101 250/254 |
| 5,804,820 | A | * | 9/1998 | Evans | G01V 5/101 250/269.2 |
| 6,373,066 | B1 | * | 4/2002 | Penn | G01T 3/02 250/363.02 |
| 8,076,634 | B2 | * | 12/2011 | Stoller | G01V 5/10 250/253 |
| 2002/0170348 | A1 | | 11/2002 | Roscoe | F17C 13/02 73/149 |
| 2007/0235667 | A1 | * | 10/2007 | Olshvanger | G01T 1/185 250/515.1 |
| 2009/0014636 | A1 | * | 1/2009 | Luling | G01T 1/185 250/256 |
| 2009/0276158 | A1 | * | 11/2009 | Kirkwood | G01V 5/101 702/8 |
| 2009/0283691 | A1 | * | 11/2009 | Stoller | G01V 5/10 250/390.1 |
| 2010/0230585 | A1 | * | 9/2010 | Zhang | G01V 5/107 250/254 |
| 2010/0314536 | A1 | * | 12/2010 | Molz | G01V 5/08 250/254 |
| 2011/0204216 | A1 | * | 8/2011 | Moake | G01V 5/125 250/269.3 |
| 2012/0126105 | A1 | * | 5/2012 | Evans | G01V 5/104 250/254 |
| 2012/0126106 | A1 | * | 5/2012 | Zhou | G01T 3/06 250/269.6 |
| 2012/0298422 | A1 | * | 11/2012 | Oxford | C22C 1/0408 175/57 |
| 2012/0326048 | A1 | * | 12/2012 | Nikitin | G01V 5/101 250/393 |
| 2013/0029886 | A1 | * | 1/2013 | Mazyar | C09K 8/54 507/270 |
| 2013/0134304 | A1 | | 5/2013 | Beekman et al. | |
| 2013/0206972 | A1 | * | 8/2013 | Zhou | G01T 3/06 250/269.4 |
| 2013/0214145 | A1 | * | 8/2013 | Roscoe | G01V 5/101 250/269.3 |
| 2013/0270431 | A1 | * | 10/2013 | Minette | G01V 5/12 250/269.3 |
| 2014/0034822 | A1 | * | 2/2014 | Evans | G01V 5/101 250/267 |
| 2016/0032708 | A1 | | 2/2016 | Mahjoub et al. | |

FOREIGN PATENT DOCUMENTS

| | | | | |
|---|---|---|---|---|
| WO | | 2010105064 | A2 | 9/2010 |
| WO | WO | 2010105064 | A2 * | 9/2010 ............ G01V 5/107 |
| WO | | 2013101981 | A1 | 7/2013 |

OTHER PUBLICATIONS

Communication Pursuant to Rule 69 EPC issued in the related EP application 13306857.7 dated Jun. 29, 2015 (2 pages).
The extended European Search Report issued in the related EP application 13306857.7 dated Jun. 3, 2014 (7 pages).
International Preliminary Report on Patentability issued in corresponding International Application PCT/US2014/070701 dated Jul. 7, 2016. 8 pages.

* cited by examiner

NEUTRON-ABSORBING GAMMA RAY WINDOW IN A DOWNHOLE TOOL

BACKGROUND

This disclosure relates to gamma ray well logging tools and, more particularly, to gamma-ray-transmissive windows that absorb neutrons in such downhole tools.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions.

A variety of downhole tools may be used to determine the properties of a geological formation surrounding a well. Some downhole tools, known as "neutron-gamma spectroscopy" tools, emit neutrons into the geological formation and detect the spectra of gamma rays that result when the neutrons interact with the elements of the formation. Interactions between the elements of the formation and the neutrons may produce gamma rays in at least two ways: by inelastic scattering and by neutron capture. Inelastic scattering occurs when fast neutrons collide with elements of the formation, which may result in the emission of one or more gamma rays. Neutron capture occurs when lower-energy thermal or epithermal neutrons are captured by the nuclei of elements of the formation, which also may result in the emission of one or more gamma rays. In either case, the various energies of the resulting gamma rays may be detected by gamma ray detectors in the downhole tool to obtain gamma ray spectrum measurements. The spectra of gamma rays obtained at various depths in the well may be used to ascertain a variety of different well properties.

Although many gamma rays are generated through interactions between the emitted neutrons with the elements of the formation, some gamma rays may be generated through interactions of the emitted neutrons with the materials of the downhole tool itself. These gamma rays produce a noise background that may reduce the signal-to-noise ratio (SNR) of the downhole tool spectroscopy measurement. Indeed, neutron interactions with the material of the downhole tool occurring near or within the gamma ray detector itself may substantially increase the amount of unwanted background noise. Since these noise-producing neutron interactions occur close to or inside the detector, the detection probability, even in the presence of a low neutron flux, may be high.

The location of the gamma ray detectors in the downhole tools may further increase the likelihood of neutrons being captured by material near or within the gamma ray detector. Indeed, to enhance the gamma ray spectroscopy signal from interactions of neutrons in the borehole and formation, a relatively thin amount of material may separate the gamma ray detector and the formation to reduce gamma ray scattering and absorption in the downhole tool. To reduce the neutron flux entering the detector or nearby parts of the downhole tool, the downhole tool may be surrounded with a layer of neutron-absorbing material to reduce the tool signal. The materials used to reduce the neutron flux entering the downhole tool, however, may also reduce the transmission of gamma rays into the detectors. It may also be noted that some downhole tools with gamma ray detectors, such as gamma-gamma density tools, natural gamma ray tools, and so forth, may use special gamma ray windows or housings made of low density low Z-materials such as titanium. While these windows may offer good transparency to gamma rays, these windows may also have substantial cross sections for interaction with neutrons and, if used in a neutron tool, may increase, rather than decrease, the neutron-induced noise background signal.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

This disclosure relates to methods and downhole tools involving neutron-absorbing gamma ray windows. In one example, a method involves emitting neutrons from a neutron source in a downhole tool in a well into a surrounding geological formation. This may produce formation gamma rays through interactions between the neutrons and elements of the geological formation. The formation gamma rays may be detected by a gamma ray detector when the gamma rays pass via a gamma ray window that includes a neutron-absorbing material disposed in a substrate material of the downhole tool. The gamma ray window may be both more transmissive of gamma rays than the substrate material and less transmissive of neutrons than a window without the neutron-absorbing material. This may decrease a neutron flux that would otherwise reach the gamma ray detector and the tool materials surrounding it and thus would otherwise lead to a background signal contaminating a signal corresponding to the detected formation gamma rays.

In another example, a downhole tool includes a neutron source, one or more gamma ray detectors, and one or more gamma ray windows. The neutron source may emit neutrons into the geological formation to cause formation gamma rays to be created through inelastic scattering or neutron capture, or both. The one or more gamma ray detectors may detect the formation gamma rays via the one or more gamma ray windows disposed within the substrate material of downhole tool. The one or more gamma ray windows may include a neutron-absorbing material that permits more gamma rays to enter the one or more gamma ray detectors than would be permitted were the one more gamma ray windows not disposed in the substrate material, while also permitting fewer neutrons to enter the one or more gamma ray detectors and the tool materials surrounding them than would be permitted were the one more gamma ray windows did not include the neutron-absorbing material.

In another example, a downhole tool includes a housing that may be placed in a wellbore, a neutron source in the housing, a gamma ray detector in the housing, and a first gamma ray window in the housing. The first gamma ray window may facilitate the passage of gamma rays from outside the housing into the gamma ray detector while inhibiting the passage of neutrons. The first gamma ray window may include an inner material that absorbs neutrons more than the housing and an outer, inert material that protects the inner material from exposure to the wellbore.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
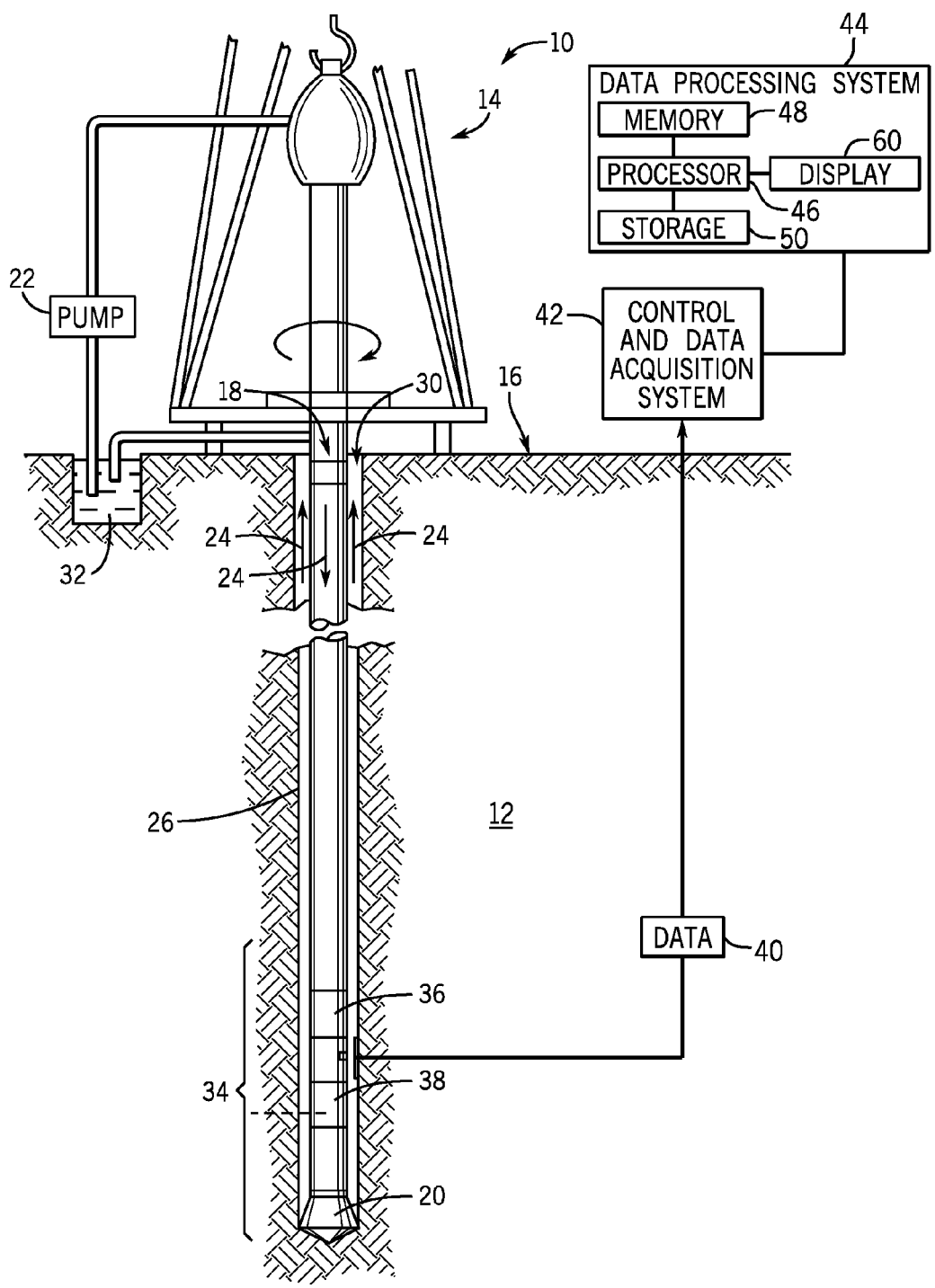
FIG. 1 is a schematic diagram of a drilling system that includes a downhole tool that obtains a more accurate gamma ray signal using neutron-absorbing gamma ray windows, in accordance with an embodiment.

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Downhole tools that perform neutron-based gamma ray logging, sometimes known as "neutron-gamma spectroscopy" tools, may emit neutrons into the geological formation and detect the spectra of the resulting gamma rays that occur due to interactions with the geological formation. A neutron-gamma spectroscopy tool may be placed into a well and may emit neutrons into the formation using a neutron source. The neutrons may interact with elements of the formation through inelastic scattering and/or neutron capture to generate gamma rays. In this disclosure, the gamma rays produced by interactions in the formation may be referred to as "formation gamma rays." These resulting formation gamma rays may scatter through the formation or arrive at the detector without any scattering on their path. The gamma rays that arrive without scattering may carry an energy signature associated with the material of the formation that caused the gamma ray to be generated. Some of the formation gamma rays may ultimately reach the downhole tool to be detected by one or more gamma ray detectors (e.g., gamma ray scintillation detectors) as gamma ray spectra. The gamma ray spectra at various depths in the well may be processed to determine various properties of the geological formation.

In order to facilitate the transmission of the gamma rays from the formation to the gamma ray detector, including to reduce scattering to preserve the unique energy signature associated with the material in which the gamma ray was created, one may use gamma ray windows in the tool. Such windows may be made of materials with relatively low atomic number and low density to reduce the probability of scattering or absorption of the gamma rays in the window (e.g., materials with sufficiently low atomic number and density to permit more gamma rays to pass than otherwise). Rather than use materials used for gamma ray windows that may also have a high transmittance for neutrons, the gamma ray window may be constructed of materials that increase the transmission of gamma rays to the detector and also reduce the transmission of neutrons compared to a gamma ray window that may be optimized for gamma ray transmission. Some materials with high gamma ray transmittance, in particular materials containing hydrogen, may also reduce the energy of neutrons entering the material and therefore enhance the likelihood of a capture reaction that may result in the emission of gamma rays. When such materials are used for windows, it is important to make sure that the neutrons passing through which may emerge with lower energy, be stopped in the material.

Some of the neutrons emitted by the downhole tool do not produce formation gamma rays in the formation, but rather may interact with the materials of the downhole tool. In some cases, a gamma ray may be emitted from within the downhole tool due to neutron capture or inelastic scattering. When such a neutron capture happens nearby or in the scintillation detector, the resulting gamma ray may be detected in the gamma detector. In this disclosure, gamma rays produced by interactions with materials of the downhole tool may be referred to as "tool gamma rays." The contribution of these tool-derived gamma rays caused by neutron capture within the downhole tool to the spectra detected by the gamma ray scintillation detectors may be understood to represent noise in the spectroscopy signal.

The downhole tool may employ one or more gamma-ray-transmissive windows that absorb neutrons to reduce the amount of noise due to the tool gamma rays. The gamma ray windows may be relatively transmissive to gamma rays while being relatively non-transmissive to neutrons. As such, the likelihood that neutrons will reach the gamma ray detectors, or the vicinity of the detectors where capture gamma rays from the tool may reach the detectors, may decrease, even while the likelihood that the formation gamma rays will reach the gamma ray detectors may increase. As will be described below, the gamma ray windows may take any suitable shape, construction, and/or materials, provided that neutrons are relatively less likely to penetrate the downhole tool to reach the vicinity of the gamma ray detectors than were the gamma ray windows not present, and provided that gamma rays are relatively more likely to penetrate the downhole tool to reach the gamma ray detectors than were the gamma ray windows not present. Indeed, the gamma ray windows may be more transmissive to gamma rays than the substrate material of the tool housing and less transmissive to neutrons than a gamma ray window that did not include the neutron-absorbing material of this disclosure. In some embodiments, this may mean that the gamma ray windows may be constructed of materials to be more transmissive to gamma rays and less transmissive to neutrons than the substrate material of the tool housing (i.e., the primary material that the tool housing is constructed from). Additionally, using the gamma rays windows may permit the gamma ray detectors in the downhole tools to be set deeper into the downhole tool than otherwise, further reducing the likelihood of detecting tool gamma rays that add noise to the spectroscopy signal. It should also be appreciated that, while this disclosure discusses neutron-gamma downhole tools by way of example, the neutron-absorbing gamma ray windows of this disclosure may effectively exclude neutrons—or at least reducing the flux of neutrons that interact with the tool materials to generate gamma rays in the energy range of interest—while transmitting gamma rays in any suitable gamma ray tool (e.g., spectroscopy or count-based) that is collocated with a neutron-based tool. For example, for gamma ray spectroscopy, it may be sufficient that the gamma rays resulting from neutron reactions in the gamma ray windows are not in the energy range of interest for the gamma ray spectroscopy processing. However, when the gamma ray detectors detect a count of gamma rays rather than gamma ray energy spectra, having gamma rays generated in the neutron-absorbing gamma window may add noise or may result in setting a high detection threshold, which in turn may result in the suppression of the gamma ray "noise" and also a reduction of the available signal.

With the foregoing in mind, FIG. 1 illustrates a drilling system 10 that includes a neutron-capture gamma ray tool having neutron-absorbing gamma ray windows. The drilling system 10 may be used to drill a well into a geological formation 12 and obtain gamma ray spectroscopy measurements useful to identify characteristics of the well. In the drilling system 10, a drilling rig 14 at the surface 16 may rotate a drill string 18 having a drill bit 20 at its lower end. As the drill bit 20 is rotated, a drilling fluid pump 22 is used to pump drilling fluid 24, referred to as "mud" or "drilling mud," downward through the center of the drill string 18 in the direction of the arrow to the drill bit 20. The drilling fluid 24, which is used to cool and lubricate the drill bit 20, exits the drill string 18 through the drill bit 20. The drilling fluid 24 then carries drill cuttings away from the bottom of a borehole 26 as it flows back to the surface 16, as shown by the arrows through an annulus 30 between the drill string 18 and the formation 12. However, as described above, as the drilling fluid flows through the annulus 30 between the drill string 18 and the formation 12, the drilling mud may begin to invade and mix with the fluids stored in the formation, which may be referred to as formation fluid (e.g., natural gas or oil). At the surface 16, the return drilling fluid 24 is filtered and conveyed back to a mud pit 32 for reuse.

As illustrated in FIG. 1, the lower end of the drill string 18 includes a bottom-hole assembly (BHA) 34 that may include the drill bit 20 along with various downhole tools. The downhole tools may collect a variety of information relating to the geological formation 12 and/or the state of drilling of the well. For instance, a measurement-while-drilling (MWD) tool 36 may measure certain drilling parameters, such as the temperature, pressure, orientation of the drilling tool, and so forth. Likewise, a logging-while-drilling (LWD) tool 38 may measure the physical properties of the geological formation 12, such as density, porosity, resistivity, and so forth.

The LWD tool 38 may collect a variety of data 40 that may be stored and processed within the LWD tool 38 or, as illustrated in FIG. 1, may be sent to the surface for processing. In the example of this disclosure, the LWD tool 38 may include a neutron-gamma spectroscopy tool that may detect the pulse height of signals associated with the energies of formation gamma rays that result when neutrons are emitted into the formation and interact with formation elements. The range of detected pulse heights may be visualized with a pulse height spectrum. The range of energies of the detected gamma rays may be visualized as an energy spectrum of the gamma rays that are detected, where the energy spectrum may be derived from the pulse height spectrum by energy calibration. The data 40 that is collected may include counts and/or detected energies of neutrons and gamma rays that reach corresponding detectors in the LWD tool 38. The data 40 may be sent via a control and data acquisition system 42 to a data processing system 44. The control and data acquisition system 42 may receive the data 40 in any suitable way. In one example, the control and data acquisition system 42 may transfer the data 40 via electrical signals pulsed through the geological formation 12 or via mud pulse telemetry using the drilling fluid 24. In another example, the data 40 may be retrieved directly from the LWD tool 38 when the LWD tool 38 returns to the surface.

The data processing system 44 may include a processor 46, memory 48, storage 50, and/or a display 52. The data processing system 44 may use the data 40 to determine various properties of the well using any suitable techniques. As will be discussed further below, the LWD tool 38 may use neutron-absorbing gamma ray windows to reduce signal contamination by stray neutrons. Thus, when the data processing system 44 processes the data 40, the determined well properties may be more accurate and/or precise than otherwise. To process the data 40, the processor 46 may execute instructions stored in the memory 48 and/or storage 50. As such, the memory 48 and/or the storage 50 of the data processing system 44 may be any suitable article of manufacture that can store the instructions. The memory 46 and/or the storage 50 may be ROM memory, random-access memory (RAM), flash memory, an optical storage medium, or a hard disk drive, to name a few examples. The display 52 may be any suitable electronic display that can display the logs and/or other information relating to properties of the well as measured by the LWD tool 38. It should be appreciated that, although the data processing system 44 is shown by way of example as being located at the surface, the data processing system 44 may be located in the LWD tool 38. In such embodiments, some of the data 40 may be processed in the LWD tool 38 and that the data 40 may be stored in the LWD tool 38, while some of the data 40 may be sent to the surface in real time. This may be the case particularly in LWD, where a limited amount of the data 40 may be transmitted to the surface during drilling or reaming operations.

Figure 9:
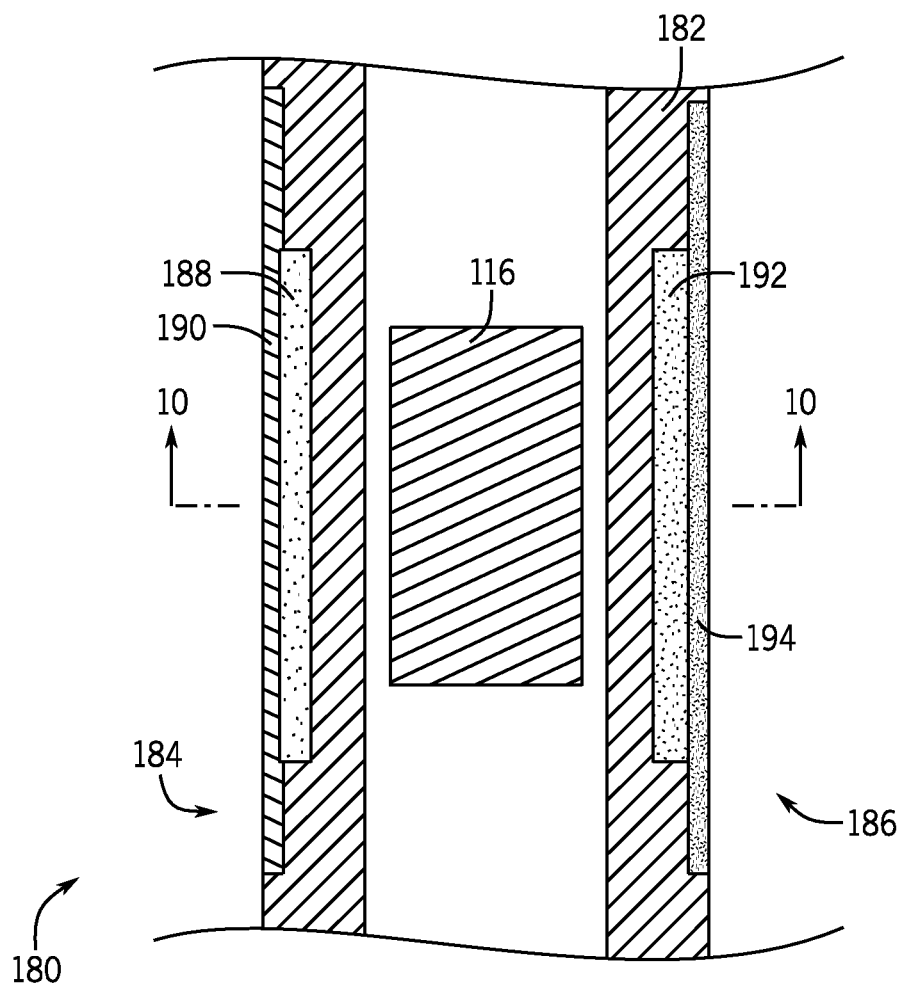
FIG. 9 is a block diagram of a wireline configuration of the downhole tool with different gamma ray window configurations on formation-facing and borehole-facing surfaces, in accordance with an embodiment.
Figure 10:
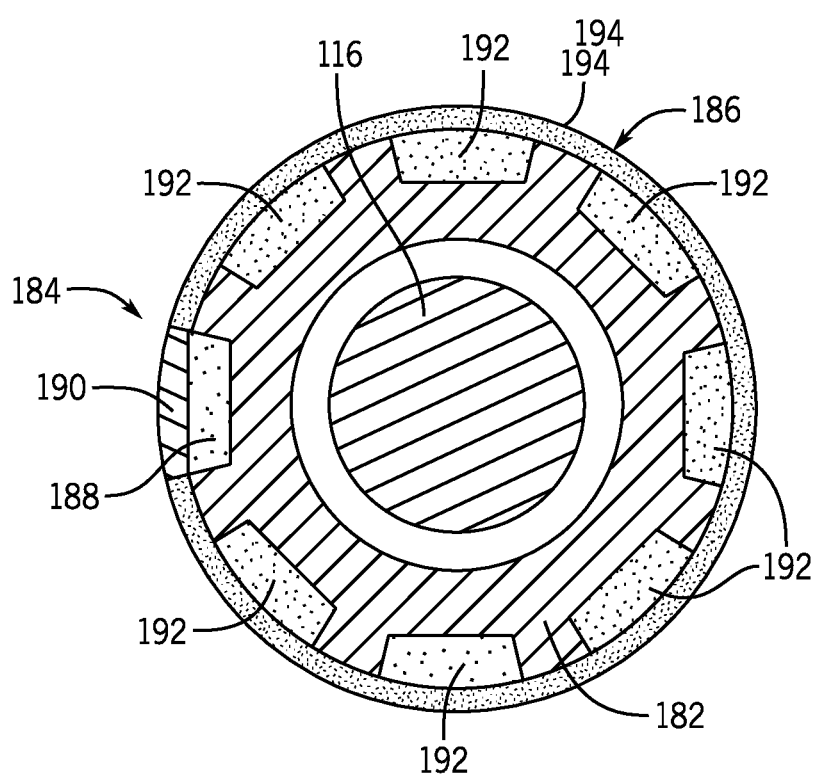
FIG. 10 is a cross-sectional view of the wireline configuration of the downhole tool of FIG. 9.

Before continuing, it should be noted that, although the neutron-gamma spectroscopy tool of this disclosure is described by way of example in a logging-while-drilling (LWD) configuration, the use of neutron-absorbing gamma ray windows as taught by this disclosure may be applied to any suitable tool of any suitable conveyance. Indeed, although FIGS. 3-8 illustrate various examples of LWD configurations, FIGS. 9 and 10 illustrate an example of a wireline configuration.

Figure 2:
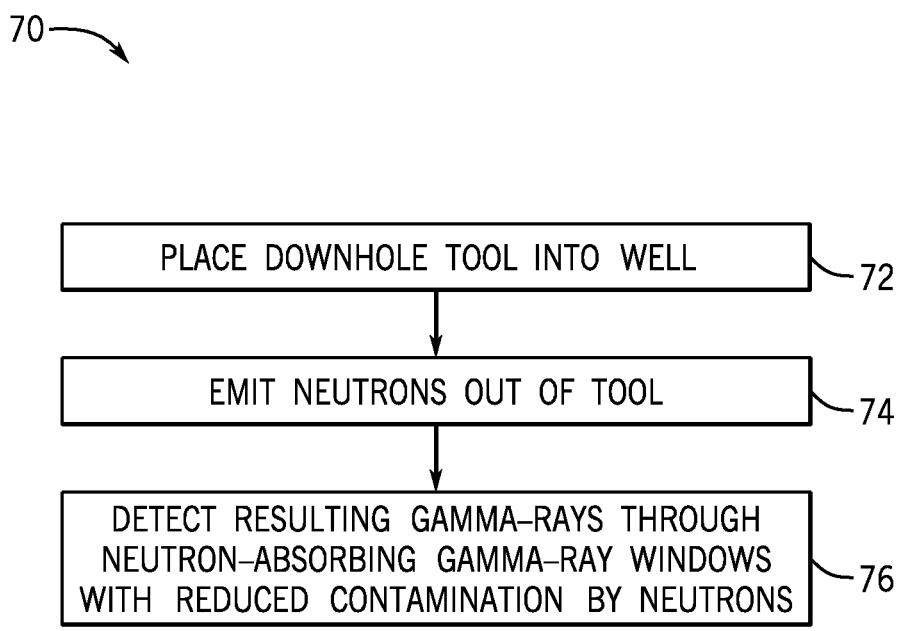
FIG. 2 is flowchart of a method for investigating a wellbore using a downhole tool that employs neutron-absorbing gamma ray windows, in accordance with an embodiment.

Regardless of the means of conveyance, the neutron-gamma spectroscopy tool of this disclosure may log the borehole 26 according to a flowchart 70 of FIG. 2. Specifically, the neutron-gamma spectroscopy tool may be placed into the well drilled in the geological formation 12 (block 72). The neutron-gamma spectroscopy tool may emit neutrons into the geological formation 12 to cause gamma rays to be created through inelastic scattering and/or neutron capture (block 74). The neutron-gamma spectroscopy tool may detect the gamma ray spectra with a contribution of the gamma rays that penetrate the formation 12 and return to the tool through certain neutron-absorbing gamma ray windows (block 76). As will be discussed below, this may reduce the amount of contamination in the signal due to neutrons while improving the signal due to formation gamma rays.

Figure 3:
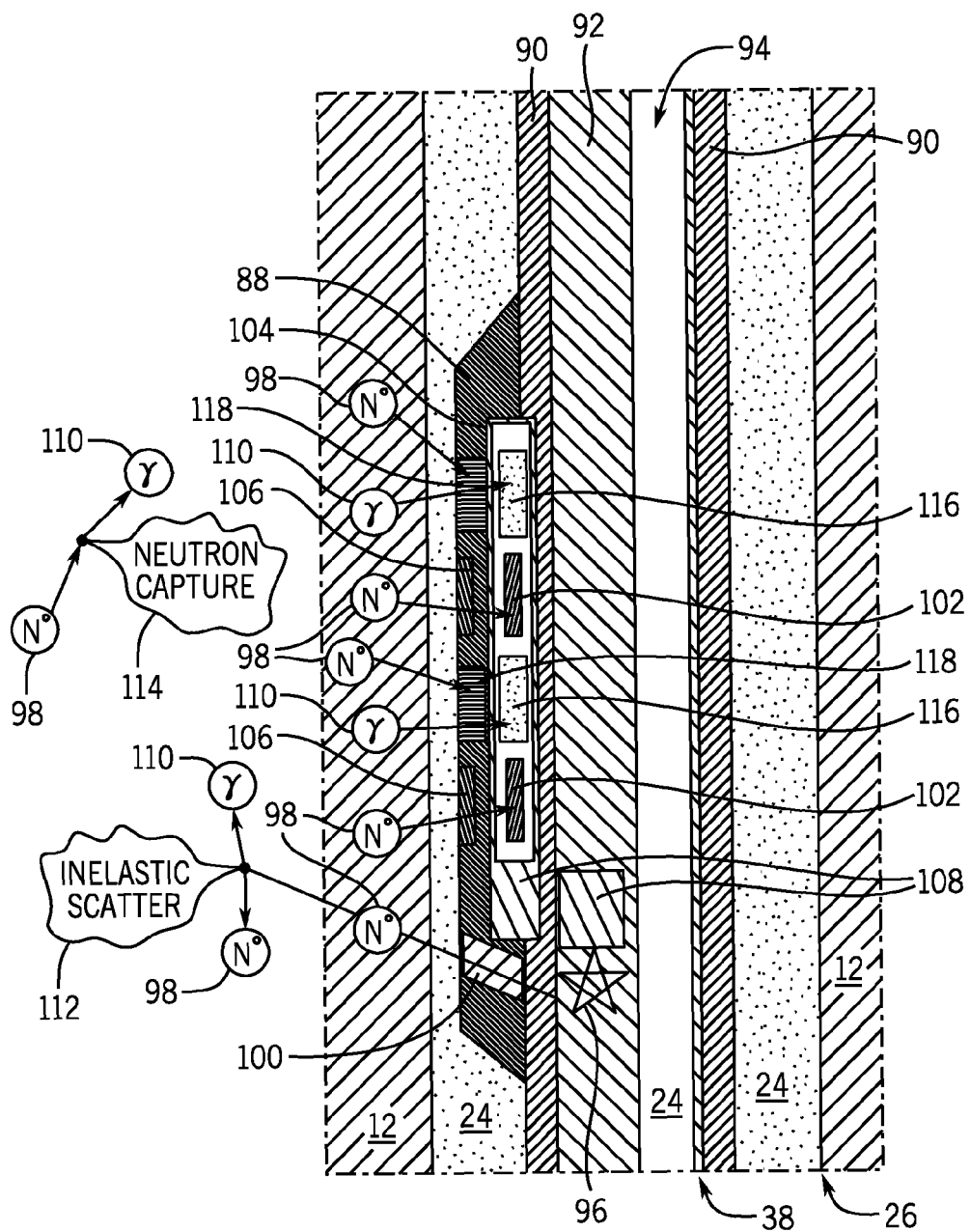
FIG. 3 is a block diagram of the downhole tool that employs neutron-absorbing gamma ray windows, in accordance with an embodiment.

One example of such a neutron-gamma spectroscopy tool in the form of an LWD tool 38 appears in FIG. 3. The LWD tool 38 is illustrated as being equipped with a stabilizer blade 88 mounted on or integrated with the tool collar 90. The tool collar 90 holds a tool chassis 92 with a mud channel 94, through which the drilling fluid 24 may pass through the drill string. In other implementations, the mud channel 94 may be separate from the chassis 92. A neutron source 96 that may be mounted in the tool chassis 92 may emit neutrons into the geological formation 12. The neutron source 96 may be any suitable source of neutrons 98. By way of example, the neutron source 96 may be a radioisotopic source such as $^{241}$AmBe or $^{252}$Cf. Additionally or alternatively, the neutron source 96 may be an electronic neutron generator that relies on a neutron generating nuclear reaction such as d-T, d-D or t-T to name a few. In one example, the neutron source 96 may be a neutron generator tube used commercially by Schlumberger Technology Corporation and known by the Minitron trademark. When the neutron source 96 is an electronic neutron generator, the neutron source 96 may continuously emit the neutrons 98 or emit the neutrons 98 in timed bursts.

The neutrons 98 may enter the formation 12 through a neutron-permissive window 100 that may enable relatively high-energy neutrons 98 (e.g., 14 MeV) to exit into the formation 12. Some of the neutrons 98 may scatter through the formation 12, slowing down as they scatter to lower epithermal and thermal ranges, and return to be detected by one or more neutron detectors 102 installed in a pressure housing 104. The neutrons 98 may reach the neutron detectors 102 by passing through corresponding neutron-permissive windows 106. The neutrons 98 may be stopped from passing through the LWD tool 38 toward the one or more neutron detectors 102 by neutron shielding 108. Although not specifically shown in FIG. 3, a neutron shielding material may partially or completely surround the stabilizer blade 88 and/or the tool collar 90. The neutron shielding material may be protected by a cover made of an abrasion-resistant material. The neutron-permissive windows 100 and 106 may be formed of any suitable neutron-permissive material, while the neutron shielding 108 may be formed of any suitable neutron-absorbing material. For example, the neutron-permissive windows 100 and 106 and the neutron shielding 108 may be formed as described in U.S. Pat. No. 8,076,634, "Neutron Shielding for Downhole Tool," which is assigned to Schlumberger Technology Corporation and which is incorporated by reference herein in its entirety for all purposes.

The neutrons 98 may also interact with the formation 12 in ways that produce gamma rays 110. As noted above, the gamma rays 110 that are generated in the formation 12 may be referred to collectively as "formation gamma rays" to distinguish them from those formed from interactions with materials of the LWD tool 38 or those from interactions in the drilling fluid 24. The neutrons 98 may generate the gamma rays 110 in the formation 12 through inelastic scattering 112 and neutron capture 114. Inelastic scattering 112 may produce inelastic gamma rays 110 through interactions of fast neutrons 98 with elements of the formation 12. One example of a reaction caused by inelastic scattering 112 is $^{A}X(n,n'\gamma)^{A}X^*$, in which the inelastic scattering 112 causes the nucleus of the isotope $^{A}X$ (where A denotes the mass number of the nucleus and X is the symbol of the corresponding element) to enter an excited state $^{A}X^*$, which may decay by the emission of one or more gamma rays 110. Other reactions caused by inelastic scattering 112 may be of the type (n,2n), (n,p), or (n,α), to name a few. Neutron capture 114 may produce capture gamma rays 110 from the capture of mostly thermal and epithermal neutrons 98 by a nucleus. The capture results in the creation of an excited nucleus with mass number A+1. The excited state may decay by the emission of one or more gamma rays 110.

The gamma rays 110 may be detected by one or more gamma ray detectors 116 in the LWD tool 38. These gamma ray detectors 110 may be scintillation detectors, for example. To reach one of the gamma ray detectors 116, the gamma rays 110 may pass through a neutron-absorbing gamma ray window 118 installed in the pressure housing 104 and/or the stabilizer blade 88. The neutron-absorbing gamma ray window 118 may take any suitable form and may be formed from any suitable materials to be more transmissive to the gamma rays 110 while being less transmissive to the neutrons 98 than were the gamma-window 118 absent.

As such, a variety of materials may be used to form the neutron-absorbing gamma ray windows 118. For instance, the material may include a material that is inert such as polyether ether ketone (PEEK) or polyether ketone ketone (PEKK), to offer two examples. The material (e.g., PEEK or PEKK) may be mixed with a neutron-absorbing material such as boron; boron carbide where boron may be enriched in $^{10}$B, which is the neutron absorbing isotope; lithium, which may be enriched in the neutron absorbing isotope $^{6}$Li; cadmium; samarium; or gadolinium; among many other materials with large neutron absorption cross sections (e.g., 10 barn, 100 barn, 1000 barn, or greater). The neutron-absorbing material may be, in some embodiments, any suitable material with a neutron absorption cross section greater than Titanium.

It should be appreciated that PEEK is a material that has been found to be highly resistant to the harsh borehole environment, which may have high temperatures, high pressures, and corrosive well bore fluids. PEEK can also easily be mixed with other materials (e.g., neutron-absorbing materials) without losing its properties. Moreover, the use of a hydrogen-containing material may further cause epithermal neutrons 98 to become thermalized—that is, to slow down and lose energy—due to the presence of hydrogen. As a result, the neutrons 98 may be more readily absorbed in the neutron-absorbing component of the gamma ray windows 118, since most neutron capture cross sections (that is, probabilities of a reaction) increase with decreasing neutron energy.

The use of $^{10}$B could introduce some additional noise in certain situations. In particular, the neutron reaction with boron-10 ($^{10}$B(n,α)$^7$Li) may result in the emission of a 480-keV gamma ray. In certain situations, however, gamma rays of lower energy may not be of interest. In fact, the 480-keV gamma rays may be used to obtain additional information or to provide a means of gain-stabilizing a gamma ray detector. Such uses are described in U.S. Published Patent Applications 2013/0206972, "Neutron Detection Based on a Boron Shielded Gamma Detector;" 2013/0134304, "Method and Apparatus for Gain Regulation in a Gamma Detector;" and/or 2012/0126106, "Neutron Detection Using a Shielded Gamma Detector;" which are assigned to Schlumberger Technology Corporation and incorporated by reference herein in their entirety for all purposes.

There are also neutron absorbers for which the neutron reaction does not result in the emission of gamma rays, such as $^3$He or $^6$Li. In some embodiments, a $^3$He detector may be used to form the gamma ray window 118. Additionally or alternatively, $^6$Li or $^6$Li-compounds may be used instead of or in addition to $^{10}$B or other neutron absorbers such as Cd, Sm, or Gd, to name a few, since the latter elements may emit high-energy gamma rays following neutron capture. The disadvantage of $^6$Li may be its lower neutron absorption cross section of 940 b for thermal neutrons at room temperature, which is about 4 times smaller than that of $^{10}$B (3840 b). This lower neutron absorption cross section suggests that a greater concentration of $^6$Li may be used to achieve a comparable result to the neutron absorption by $^{10}$B. Suitable Li-compounds may include LiF and $Li_2CO_3$, since F, C, and O have relatively small neutron capture cross sections. This may result in minimal, if any, contribution from neutron capture and, accordingly, relatively few resulting gamma rays from the materials other than $^6$Li in the compound.

The material used in the gamma ray windows 118 is not limited to PEEK or similar materials. Metal alloys, such as Al—Li alloys, may be found in aerospace applications and may contain up to 4% lithium. These metal alloys could be produced with natural lithium, which contains about 7.5% $^6$Li, or with enriched $^6$Li, which may contain 90% or more $^6$Li. Additionally or alternatively, lithium or lithium compounds that are more chemically inert than the metal may be embedded in organic materials such as PEEK, PEKK, polycarbonates and other similar materials. For example, silicones used in downhole applications may be mixed with neutron absorbers to form neutron absorbing gamma ray windows. Yet another approach may be in the use of sintered or dispersed nanomaterials such as beryllium boride, which may act as both a neutron absorber and a neutron reflector, while providing excellent gamma ray transmission. Likewise, boron carbide ceramic is yet another possible window material as are borosilicate glasses or ceramics containing borosilicates or lithium di-silicate for example As should be appreciated, the gamma ray windows 118 may be formed from any suitable materials with neutron-absorbing characteristics and gamma-ray transmission characteristics. Indeed, many materials may be found that have low atomic number and low density—and therefore good gamma ray transmission—as well as good neutron absorption.

Many alloys may not have sufficient corrosion resistance to be exposed directly to the borehole environment. These materials may be used inside the pressure housing 104, however, which may provide protection from the borehole 26 fluids. Additionally or alternatively, as will be discussed further below, a gamma ray window 118 of such a material may be protected by a corrosion-resistant outer layer. A gamma ray window 118 made of an Al—Li alloy may, for instance, be covered by a thin, corrosion-resistant and impermeable layer of a material such as nickel or a nickel alloy. Doing so may allow the gamma ray window 118 to be used as a structural material that is exposed to drilling fluids 24 and pressure. Indeed, it may not be desirable for the neutron-absorbing gamma ray window 118 to be exposed to erosion by the drilling fluid 24, because a change in the thickness of the gamma ray window 118 may affect the neutron absorption. If the gamma ray window 118 is too thin in relation to the absorptive properties of the material used in the gamma ray window 118, a larger number of neutrons 98 may enter the gamma ray detector 116. As a result, there may be an undesired and unpredictable additional amount of tool background due to tool gamma rays created by the neutrons 98 that have penetrated the gamma ray window 118.

Figure 4:
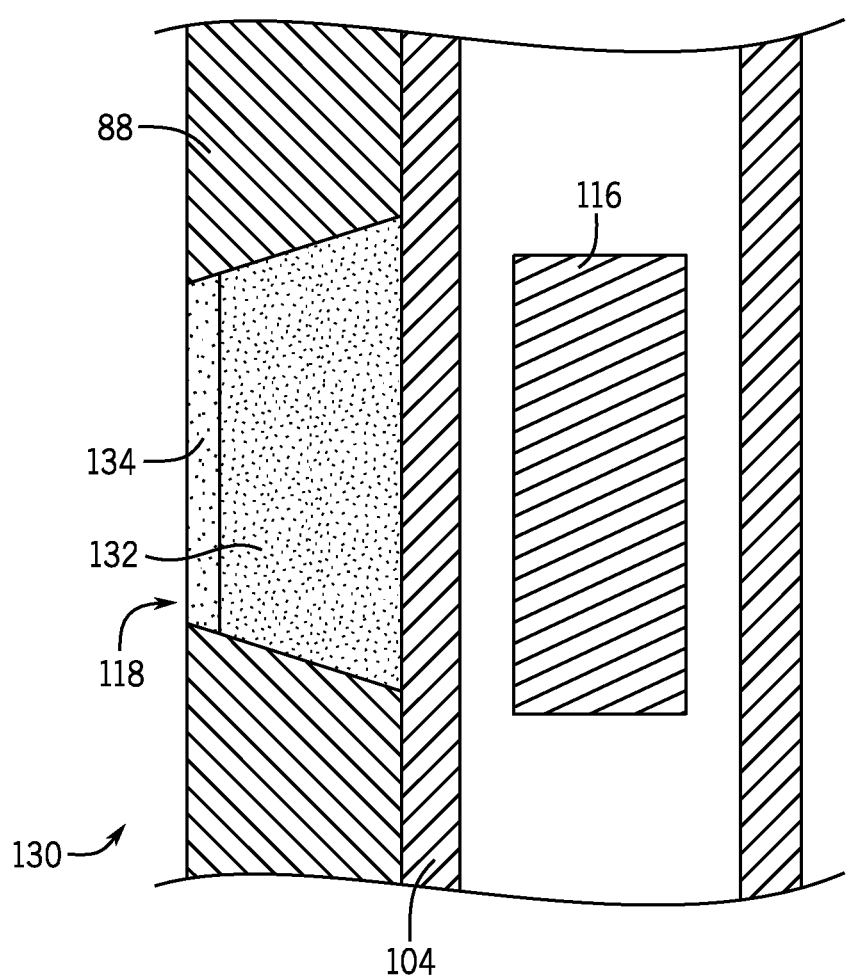
FIG. 4 is a block diagram of a configuration of a neutron-absorbing gamma ray window that includes an inner neutron-absorbing layer and an outer inert layer, in accordance with an embodiment.

A configuration 130 of FIG. 4 illustrates one construction of a gamma ray window 118 that may reduce exposure to erosive drilling fluids 24. FIG. 4 illustrates the placement of the gamma ray window 118 within the stabilizer blade 88 and in front of the gamma ray detector 116 against the pressure housing 104. The gamma ray window 118 of the configuration 130 includes at least two layers: an inner layer 132 covered by an outermost layer 134. The inner layer 132 may be formed from any suitable neutron-absorbing, gamma-ray-transmissive materials, such as those discussed above. The outermost layer 134 may be formed from an inert material that may serve as a sacrificial layer that can be replaced after being eroded. In one example, the outermost layer 134 is formed from a host material used by the inner layer 132, except that the outermost layer 134 may not include an embedded neutron absorbing material. In this way, if the outermost layer 134 is eroded, then the neutron absorption properties of the gamma ray window 118 may be affected minimally. For instance, if the outermost layer 134 is eroded, the absorption may be affected slightly by possible changes in neutron thermalization and by possible neutron absorption in the borehole fluid 24 (e.g., if the fluid were to contain chlorides or boron compounds, additional neutrons 98 may be absorbed because these materials are neutron absorbers).

Figure 5:
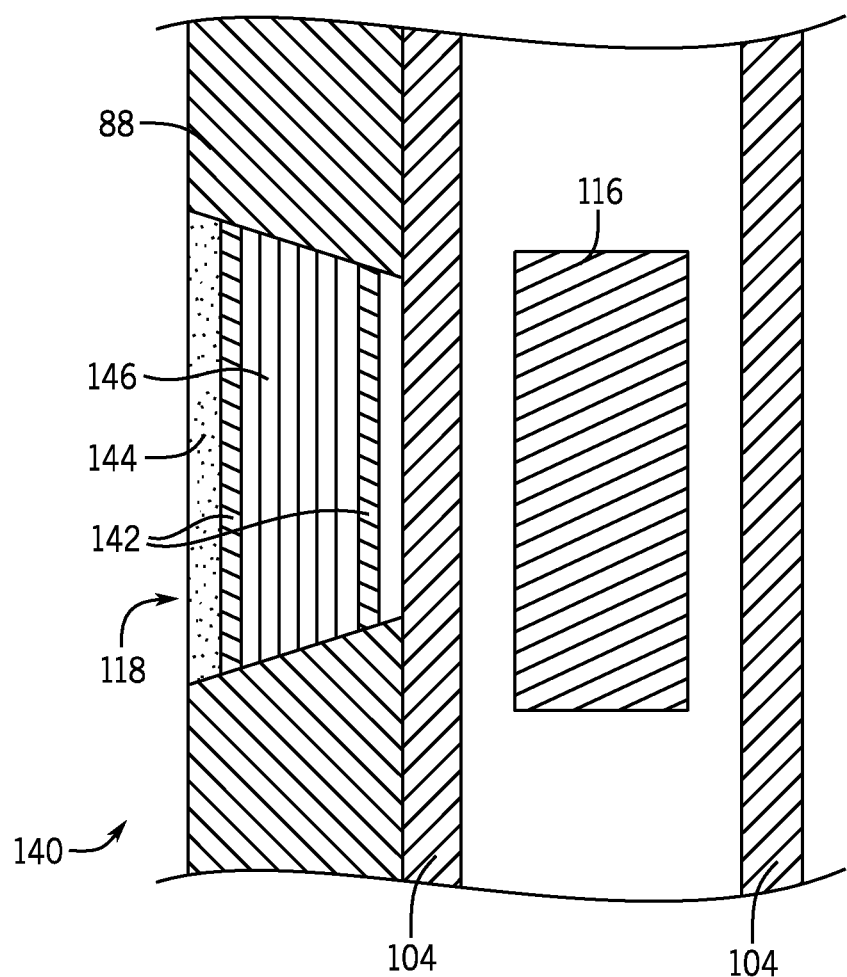
FIG. 5 is a block diagram of a configuration of a neutron-absorbing gamma ray window that includes various layers of neutron-absorbing, inert, and/or structural materials, in accordance with an embodiment.

The neutron-absorbing gamma ray window 118 may also be made of multiple layers of materials that may include various layers of neutron absorbers, inert/sacrificial, and structural materials, as shown by a configuration 140 of FIG. 5. In FIG. 5, the gamma ray window 118 is shown within the stabilizer blade 88, in front of the gamma ray detector 116, and against the pressure housing 104. The gamma ray window 118 of the configuration 140 may include layers of neutron-absorbing, gamma-ray-transmissive material 142, an outermost sacrificial layer 144, and various structural layers 146. The outermost sacrificial layer 144 may have a similar construction and serve a similar purpose as the outermost layer 134 of the configuration 130 of FIG. 3. For example, the outermost sacrificial layer 144 may be made of PEEK. The inert outermost sacrificial layer 144 may be followed by a layer of the neutron-absorbing, gamma-ray-transmissive material 142, which may be formed from any suitable neutron-absorbing, gamma-ray-transmissive materials, such as those discussed above. For example, the neutron-absorbing, gamma-ray-transmissive material 142 may be a layer of a neutron absorber such as lithium or a lithium compound. Additional structural layers 146 may or may not be inert material, which may be the same as the material as the first layer but may also be a different material, such as an epoxy, or a neutron reflector such as beryllium or aluminum. The structural layers 146 may be followed by one or more layers of the neutron-absorbing, gamma-ray-transmissive material 142. In some embodiments, multiple structural layers 146 may interleave multiple layers of the neutron-absorbing, gamma-ray-transmissive material 142 to provide further structural support. The structural materials of the structural layers 146 may include, for example, organic materials, silicones, and/or metals, to name a few examples.

Before continuing, it may be noted that the gamma ray window 118 of the configuration 130 of FIG. 3 is shown to have a different shape from the gamma ray window 118 of the configuration 140 of FIG. 4. These shapes are provided by way of example, and are not intended to be limiting. It is believed that a gamma ray window 118 of any configuration may be formed into any suitable desired shape, whether to take the shape of FIG. 3, FIG. 4, or any other suitable geometry.

Figure 6:
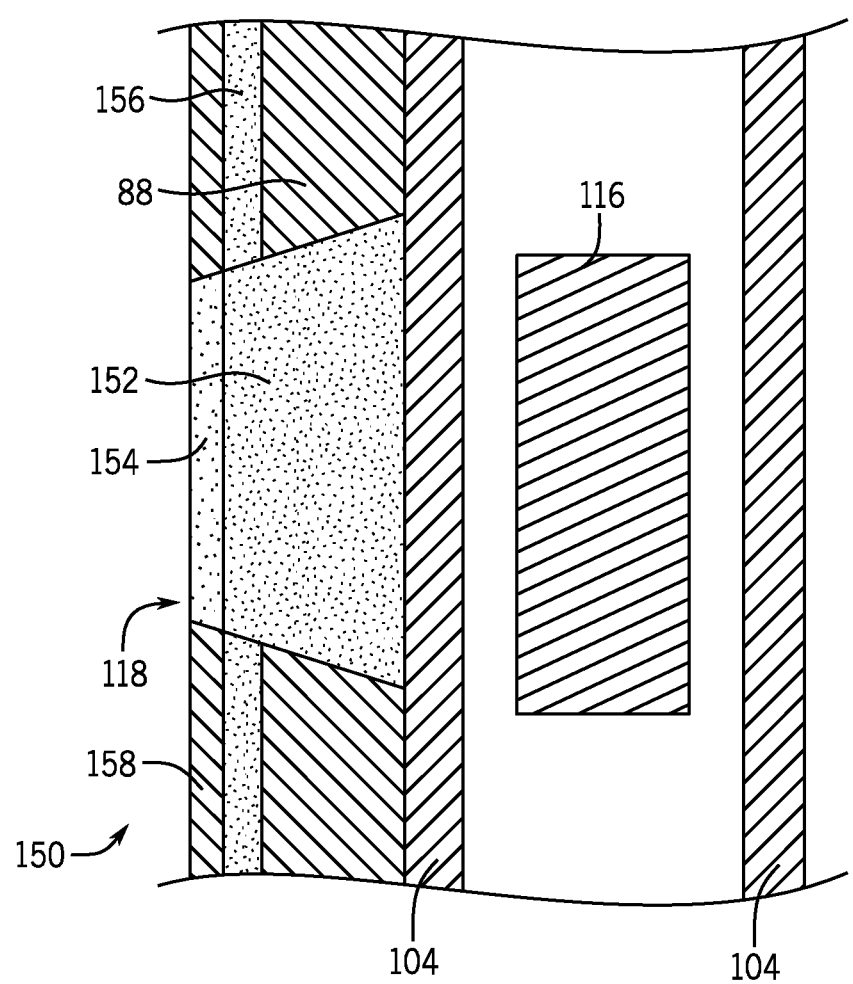
FIG. 6 is a block diagram of a configuration of a neutron-absorbing gamma ray window that is contiguous with a neutron-absorbing layer disposed in a housing of the downhole tool, in accordance with an embodiment.

A configuration 150 of FIG. 6 represents a variant of the gamma ray window 118 configuration 130 shown in FIG. 4. In the configuration 150 of FIG. 6, as in those discussed above, the gamma ray window 118 is shown within the stabilizer blade 88, in front of the gamma ray detector 116, and against the pressure housing 104. The gamma ray window 118 of the configuration 150 includes at least two layers: an inner layer 152 covered by an outermost layer 154. The inner layer 152 and the outermost layer 154 may be formed and/or may serve the same function as the inner layer 132 and the outermost layer 154 as discussed above. In the configuration 150 of FIG. 6, a neutron-absorbing layer 156 has been added to the stabilizer blade 88. The neutron-absorbing layer 156 may be protected from damage or erosion by an outer protective cover 158, which may be made of an abrasion resistant material, such as a hard metal or a layer of tungsten carbide, to provide a few examples.

Figure 7:
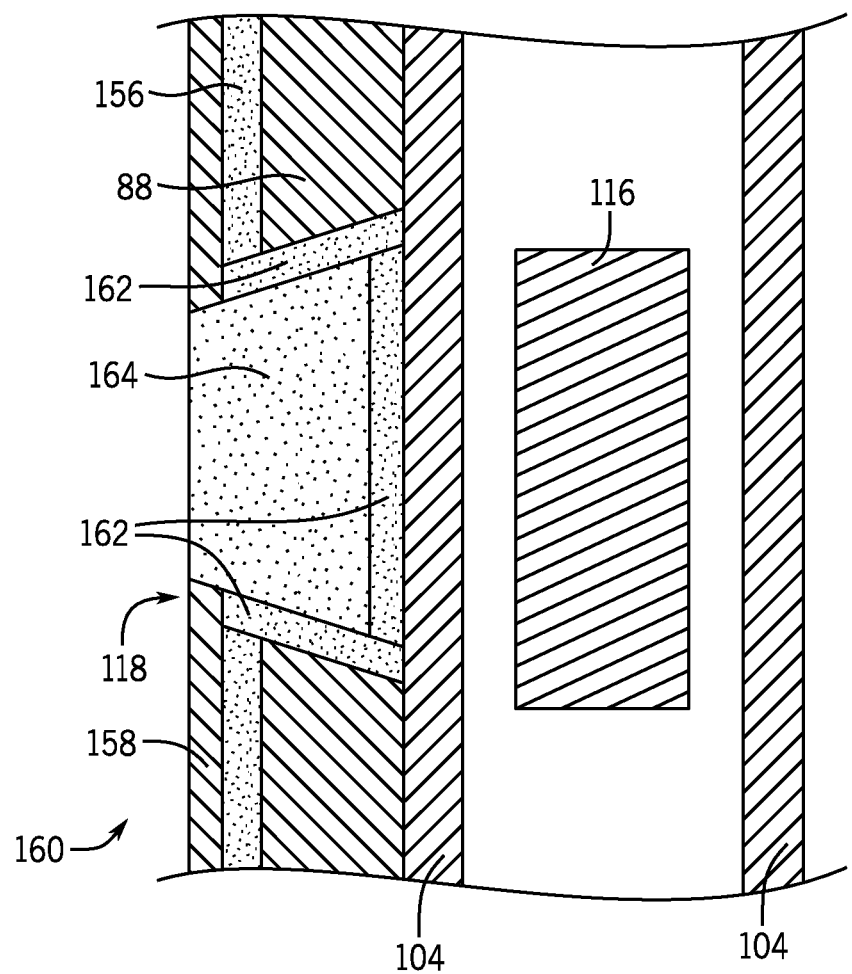
FIG. 7 is a block diagram of a configuration of a neutron-absorbing gamma ray window that includes an inner neutron-absorbing layer disposed around the inner dimensions of the gamma ray window, in accordance with an embodiment.

In another configuration 160, shown in FIG. 7, a neutron-absorbing border layer 162 may surround an inert material 164 in the gamma ray window 118. In the configuration 160 of FIG. 7, as in those discussed above, the gamma ray window 118 is shown within the stabilizer blade 88, in front of the gamma ray detector 116, and against the pressure housing 104. The neutron-absorbing border layer 162 of the configuration 160 may prevent neutrons 98 traveling in the material of the LWD tool 38 from entering the gamma ray window 118. In addition, the neutron-absorbing border layer 162 may also reduce the number of neutrons 98 that exit the gamma ray window 118 to travel into the surrounding material in the LWD tool 38, where interactions between the neutrons 98 and the material of the LWD tool 38 may cause the emission of unwanted gamma rays. The configuration 160 of FIG. 7 also may include the neutron-absorbing layer 156 and the outer protective cover 158, which are discussed above with reference to FIG. 6.

Figure 8:
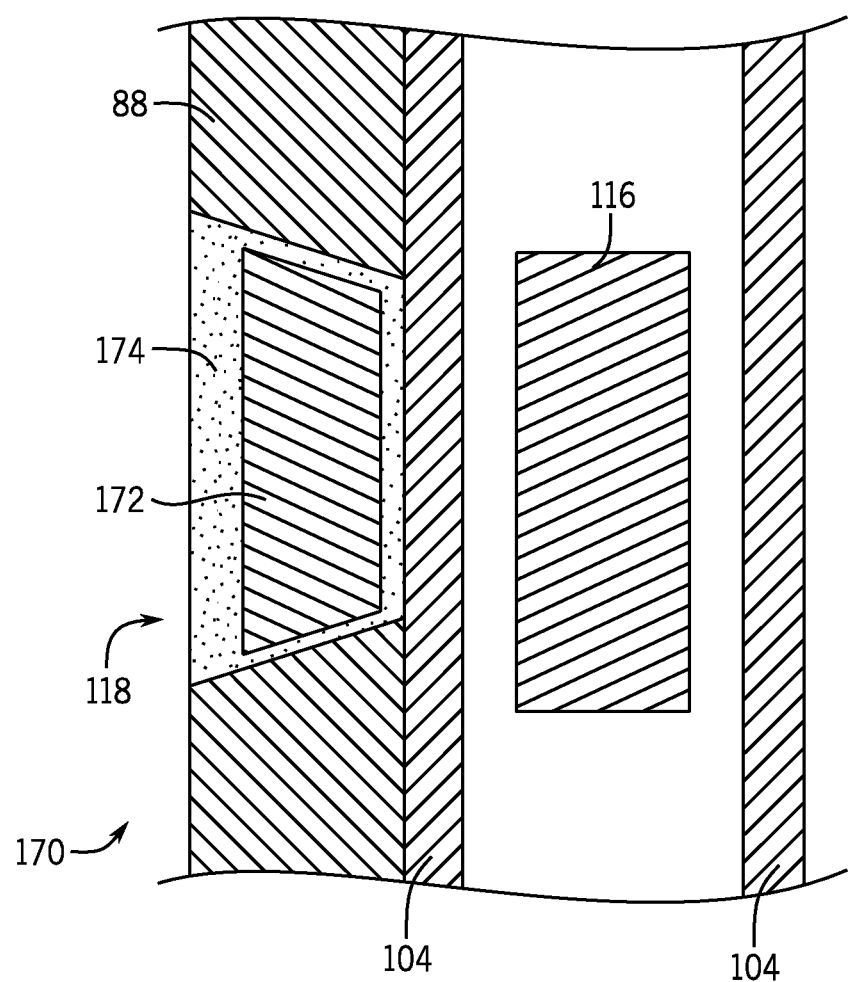
FIG. 8 is a block diagram of a configuration of a neutron-absorbing gamma ray window that includes an inner neutron-absorbing material that is surrounded by an outer inert layer, in accordance with an embodiment.

The gamma ray window 118 may also take the form of a configuration 170, shown in FIG. 8, in which a neutron-absorbing, gamma-ray-transmissive material 172 may be surrounded (e.g., encapsulated) by an inert structural material 174. In the configuration 170 of FIG. 8, as in those discussed above, the gamma ray window 118 is shown within the stabilizer blade 88, in front of the gamma ray detector 116, and against the pressure housing 104. The neutron-absorbing, gamma-ray-transmissive material 172 may include any suitable material, including those discussed above. The inert structural material 174 may be any suitable material that may protect the neutron-absorbing, gamma-ray-transmissive material 172 from environmental effects and possible degradation due to wellbore fluids, air, humidity, and so forth. The inert structural material 174 may be, for example, any suitable implementation of the structural or inert materials discussed above that may also be transmissive to gamma-rays. Because the neutron-absorbing, gamma-ray-transmissive material 172 is fully encapsulated and protected in the configuration 170 of FIG. 8, the neutron-absorbing, gamma-ray-transmissive material 172 may be a material that is particularly susceptible to environmental effects. For example, the neutron-absorbing, gamma-ray-transmissive material 172 may include a powder, compressed powder, solid neutron-absorbing material, or even a gas material (e.g., a $^3$He gas volume that may or may not operate as a $^3$He detector). Thus, although a neutron absorber in powder form might otherwise be highly susceptible to environmental effects if exposed to the environment, it may become usable by surrounding (e.g., encapsulating) the neutron-absorbing, gamma-ray-transmissive material 172 with the inert material 174.

The gamma ray windows 118 may also be used in wireline tools. For example, as shown by a wireline configuration 180 in FIGS. 9 and 10, a wireline pressure housing 182 may contain the gamma ray detector 116. The wireline configuration 180 may include a formation-facing surface 184 and a borehole-facing surface 186. In the wireline configuration 180, the formation-facing surface 184 may be held against the geological formation 12 by any suitable eccentralizing device (not shown). The formation-facing surface 184 may be subject to wear and, as such, may be equipped with a neutron-absorbing gamma ray window 188 covered by a wear protection layer 190 over. Rather than use tungsten carbide (WC) for wear protection, since tungsten may have a high gamma ray scattering and absorption cross section, the wear protection layer 190 may be made of any suitable protective material (e.g., a wear-resistant material or a sacrificial layer of inert material). In one example, the wear protection layer 190 may be made of titanium or an alloy of titanium covered with a wear-resistant surface of chromium carbide. Below the wear protection layer 190 is the neutron-absorbing gamma ray window 188, which may contain a neutron-absorbing material to reduce the likelihood that neutrons may enter or closely approach the gamma ray detector 116.

The borehole-facing surface 186 may not be subject to the same degree of wear as the formation-facing surface 184. As such, the rest of the circumference may use the same or different gamma ray windows 192 that may be covered by a neutron-absorbing layer 194. In one example, the neutron-absorbing layer 194 may be hydrogenated nitrile butadiene rubber (HNBR) loaded with a neutron-absorbing material such as $B_4C$ or any other suitable elements or compounds, such as those previously mentioned above. Because the neutron-absorbing layer 194 is less likely to wear away, and thus the neutron-absorbing properties of the combination of the neutron-absorbing layer 194 and the gamma ray windows 192 are unlikely to change due to wear, the gamma ray windows 192 may or may not include a neutron-absorbing material. Thus, the gamma ray windows 192 may be substantially the same as the neutron-absorbing gamma ray windows 188 in certain embodiments, but may alternatively be substantially free of neutron-absorbing materials, as may be used in downhole tools that are not collocated with a neutron source 96.

As seen in FIG. 10, which represents a cross-sectional view of the configuration 180 of FIG. 10 along cut lines 10-10, the gamma ray windows 192 may be distributed around the circumference of the borehole-facing surface 186 for improved gamma ray transmission. The borehole-facing surface 186 may constitute the majority of the circumference because just a relatively small proportion of the configuration 180 contacts the formation 12. As a result, there may be more of the gamma ray windows 192 than of the gamma ray windows 188 (e.g., several as compared to one).

The neutron-absorbing layer 194 may be formed, in some embodiments, from a neutron-absorbing sleeve around the circumference at least where the gamma ray windows 192 are located. Additionally or alternatively, the neutron-absorbing sleeve may be replaced by a neutron-absorbing coating such as $B_4C$. Indeed, this may be possible because the borehole-facing surface 186 is not subject to wear in the manner of the formation-facing surface 184. Thus, in certain embodiments, the outermost surfaces (e.g., ribs between the gamma ray windows 192) may be covered by a neutron absorber and the windows gamma ray windows 192 may be made of a compound containing a neutron absorbing material, as described previously. This may allow a reduction in tool diameter as the neutron-absorbing coating may be thinner than a neutron-absorbing sleeve. To further enhance the gamma ray transmission, the housing may be made of a high-strength Titanium alloy rather than a stainless steel or Inconel material.

Although the various devices and configurations of gamma ray windows discussed above are described individually, it should be appreciated that they are not mutually exclusive. Indeed, the various devices and configurations discussed above may be used in any suitable combination. Materials and/or structures discussed above with reference to one configuration of a gamma ray window may be combined with another configuration of a gamma ray window to suitably provide neutron-absorbing, gamma-ray-transmissive windows to enhance the signal of formation gamma rays while reducing the noise due to tool gamma rays.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A method comprising:
    emitting neutrons from a neutron source in a downhole tool in a well into a surrounding geological formation to produce formation gamma rays through interactions between the neutrons and elements of the geological formation; and
    detecting the formation gamma rays in a gamma ray detector via a gamma ray window disposed in a substrate material of the downhole tool, wherein the substrate material is a material of the tool housing, wherein the gamma ray window comprises a neutron-absorbing material and is both more transmissive of gamma rays than the substrate material of the downhole tool and less transmissive of neutrons than were the gamma ray window without the neutron-absorbing material, to decrease a neutron flux that would otherwise reach the gamma ray detector while enhancing a probability that the formation gamma rays reach the gamma ray detector.

2. The method of claim 1, wherein the gamma rays are detected via the gamma ray window, wherein the gamma ray window comprises a plurality of component regions, at least one of which comprises the neutron-absorbing material and at least one of which is inert.

3. The method of claim 1, comprising absorbing neutrons in the gamma ray window using the neutron-absorptive material in the gamma ray window that has a neutron absorption cross section of at least 10 barn.

4. The method of claim 1, comprising reducing an energy of neutrons that enter the gamma ray window using a hydrogenous material in the gamma ray window to increase a likelihood that the neutrons are absorbed by the gamma ray window.

5. The method of claim 1, comprising reflecting neutrons that enter the gamma ray window using a neutron-reflective material in the gamma ray window to decrease the neutron flux that would otherwise reach the gamma ray detector.

6. A downhole tool comprising:
    a neutron source configured to emit neutrons into a geological formation to cause formation gamma rays to be created through inelastic scattering or neutron capture, or both;
    one or more gamma ray detectors disposed within a substrate material of the downhole tool, wherein the substrate material is a material of the tool housing, wherein the one or more gamma ray detectors are configured to detect the formation gamma rays; and
    one or more gamma ray windows disposed within the substrate material of downhole tool, wherein the one or more gamma ray windows comprise a neutron-absorbing material that is configured to permit more gamma rays to enter the one or more gamma ray detectors than would be permitted were the one or more gamma ray windows not disposed in the substrate material, while also permitting fewer neutrons to enter the one or more gamma ray detectors and the substrate material immediately adjacent to them than would be permitted were the one or more gamma ray windows without the neutron-absorbing material.

7. The downhole tool of claim 6, wherein the neutron-absorbing material comprises Li, enriched $^6$Li, B, enriched $^{10}$B, Cd, Sm, or Gd, or any combination thereof.

8. The downhole tool of claim 6, wherein at least one of the one or more gamma ray windows comprises an inert material mixed with the neutron-absorbing material, wherein the inert material comprises PEEK, PEKK, Al, silicone, or beryllium, or any combination thereof.

9. The downhole tool of claim 6, wherein at least one of the one or more gamma ray windows comprises an outermost layer of inert material that covers an inner layer of the neutron-absorbing material and protects the inner layer of the neutron-absorbing material from exposure to environmental effects downhole.

10. The downhole tool of claim 9, wherein the outermost layer of inert material comprises a sacrificial layer configured to be worn away without substantially changing the neutron-absorbing properties of the at least one gamma ray window.

11. The downhole tool of claim 9, wherein the inner layer comprises an alloy comprising aluminum or lithium, or both, and the outermost layer comprises a nickel or a nickel alloy.

12. The downhole tool of claim 6, wherein at least one of the one or more gamma ray windows comprises a $^3$He detector or a $^3$He gas volume, or both.

13. The downhole tool of claim 6, wherein at least one of the one or more gamma ray windows comprises the neutron-absorbing material surrounded on all sides by an inert material.

14. The downhole tool of claim 13, wherein the neutron-absorbing material comprises a powder or a gas.

15. The downhole tool of claim 6, wherein at least one of the one or more gamma ray windows comprises alternating layers of inert structural material and the neutron-absorbing material.

* * * * *